(12) United States Patent
Lee et al.

(10) Patent No.: US 10,504,560 B2
(45) Date of Patent: Dec. 10, 2019

(54) ELECTRONIC DEVICE AND OPERATION METHOD THEREOF

(71) Applicant: SAMSUNG ELECTRONICS CO., LTD., Suwon-si, Gyeonggi-do (KR)

(72) Inventors: Seoyoung Lee, Suwon-si (KR); Bado Lee, Seongnam-si (KR); Yumin Jung, Suwon-si (KR); Daehee Kim, Suwon-si (KR); Dae-Kyu Shin, Suwon-si (KR); Sung Dae Cho, Yongin-si (KR); Ji-Yoon Park, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/648,766

(22) Filed: Jul. 13, 2017

(65) Prior Publication Data

US 2018/0033463 A1 Feb. 1, 2018

(30) Foreign Application Priority Data

Aug. 1, 2016 (KR) .................. 10-2016-0098243

(51) Int. Cl.
| | |
|---|---|
| *G11B 27/30* | (2006.01) |
| *G11B 27/28* | (2006.01) |
| *G11B 27/031* | (2006.01) |
| *G06K 9/00* | (2006.01) |
| *H04N 5/232* | (2006.01) |
| *H04N 5/77* | (2006.01) |
| *G11B 27/34* | (2006.01) |
| *H04N 5/93* | (2006.01) |

(52) U.S. Cl.
CPC ...... *G11B 27/3081* (2013.01); *G06K 9/00677* (2013.01); *G06K 9/00718* (2013.01); *G06K 9/00751* (2013.01); *G11B 27/031* (2013.01); *G11B 27/28* (2013.01); *G11B 27/34* (2013.01); *H04N 5/23216* (2013.01); *H04N 5/23293* (2013.01); *H04N 5/772* (2013.01); *H04N 5/93* (2013.01); *G06K 9/00228* (2013.01)

(58) Field of Classification Search
USPC .................................. 386/239–248
See application file for complete search history.

(56) References Cited

U.S. PATENT DOCUMENTS

| | | | |
|---|---|---|---|
| 9,013,604 B2 | 4/2015 | Karn et al. | |
| 2005/0257152 A1* | 11/2005 | Shimizu | G11B 27/034 715/723 |
| 2006/0257048 A1* | 11/2006 | Lin | G06K 9/00711 382/276 |

(Continued)

FOREIGN PATENT DOCUMENTS

| | | |
|---|---|---|
| KR | 10-2015-0011652 | 2/2015 |
| KR | 10-1536930 | 7/2015 |

*Primary Examiner* — Hung Q Dang
(74) *Attorney, Agent, or Firm* — Nixon & Vanderhye P.C.

(57) ABSTRACT

The present disclosure relates to an electronic device and a method of operation thereof, and the electronic device includes: a display; and a processor electrically connected with the display, and the processor is configured to extract a plurality of frames from video data, to identify a size of an object included in each of the extracted frames and a number of objects, to determine a layout regarding each of the extracted frames based on the size of the object and the number of objects, and to display the extracted frames on the display to correspond to the layout.

20 Claims, 17 Drawing Sheets

(56) References Cited

U.S. PATENT DOCUMENTS

| | | | |
|---|---|---|---|
| 2010/0077297 A1* | 3/2010 | Hori | G06T 11/60 715/243 |
| 2013/0259445 A1* | 10/2013 | Suzuki | H04N 9/87 386/241 |
| 2015/0278605 A1* | 10/2015 | Seo | G06K 9/00711 382/195 |

* cited by examiner

ELECTRONIC DEVICE AND OPERATION METHOD THEREOF

CROSS-REFERENCE TO RELATED APPLICATION

The present application is based on and claims priority under 35 U.S.C. § 119 to an application filed in the Korean Intellectual Property Office on Aug. 1, 2016 and assigned Serial No. 10-2016-0098243, the content of which are incorporated by reference herein in its entirety.

BACKGROUND

1. Technical Field

The present disclosure relates generally to an electronic device and an operation method thereof.

2. Description of Related Art

Electronic devices are normally provided with a display module, and are also provided with a high-pixel camera module to be able to photograph a still image or a moving image, in addition to performing a basic function of communicating with others.

In addition, electronic devices may generate or store various types of data. For example, electronic devices may generate and store video data using a camera function.

Electronic devices may provide summary information regarding video data. For example, electronic devices may provide summary information using one frame included in video data as a thumbnail image, but there is a limit to summarizing contents of video data using such a thumbnail image.

SUMMARY

Various example embodiments of the present disclosure provide an electronic device which can generate summary information by extracting a plurality of frames from video data, and an operation method thereof.

Various example embodiments of the present disclosure also provide an electronic device which can apply a different layout based on similarity between extracted frames, and an operation method thereof.

Various example embodiments of the present disclosure also provide an electronic device which can adjust a time to reproduce video data based on a frame selected from frames provided as summary information, and an operation method thereof.

According to an example aspect of the present disclosure, an electronic device may include: a display; and a processor electrically connected with the display, and the processor may be configured to extract a plurality of frames from video data, to identify at least one of a size of an object included in each of the extracted frames and a number of objects included in each of the extracted frames, to determine a layout regarding each of the extracted frames based on the size of the object and the number of objects, and to display the extracted frames on the display to correspond to the layout.

According to another example aspect of the present disclosure, a method of operating an electronic device may include: extracting a plurality of frames from video data; identifying at least one of a size of an object included in each of the extracted frames and a number of objects included in each of the extracted frames; determining a layout regarding each of the extracted frames based on the size of the object and the number of objects; and displaying the extracted frames to correspond to the layout.

According to another example aspect of the present disclosure, a computer-readable recording medium may store a program which, when executed by a processor, cause an electronic device to perform at least the operations of: extracting a plurality of frames from video data; identifying at least one of a size of an object included in each of the extracted frames and a number of objects included in each of the extracted frames; determining a layout regarding each of the extracted frames based on the size of the object and the number of objects; and displaying the extracted frames to correspond to the layout.

According to another example aspect of the present disclosure, an electronic device may include: a housing; a touch screen display exposed through a part of the housing; a camera exposed through a part of the housing; a wireless communication circuit included in the housing; a processor electrically connected with the display, the camera, and the wireless communication circuit; and a memory electrically connected with the processor and configured to store video data including a plurality of frames. The memory may store instructions that, when executed by the processor, cause the processor to recognize a human face and/or an animal included in at least a part of the plurality of frames, to classify the plurality of frames into at least one group based on the recognized face and/or animal, to select a plurality of frames from the at least one group, and to arrange the selected plurality of frames and display the selected plurality of frames on the display simultaneously.

BRIEF DESCRIPTION OF THE DRAWINGS

The above and other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1A:
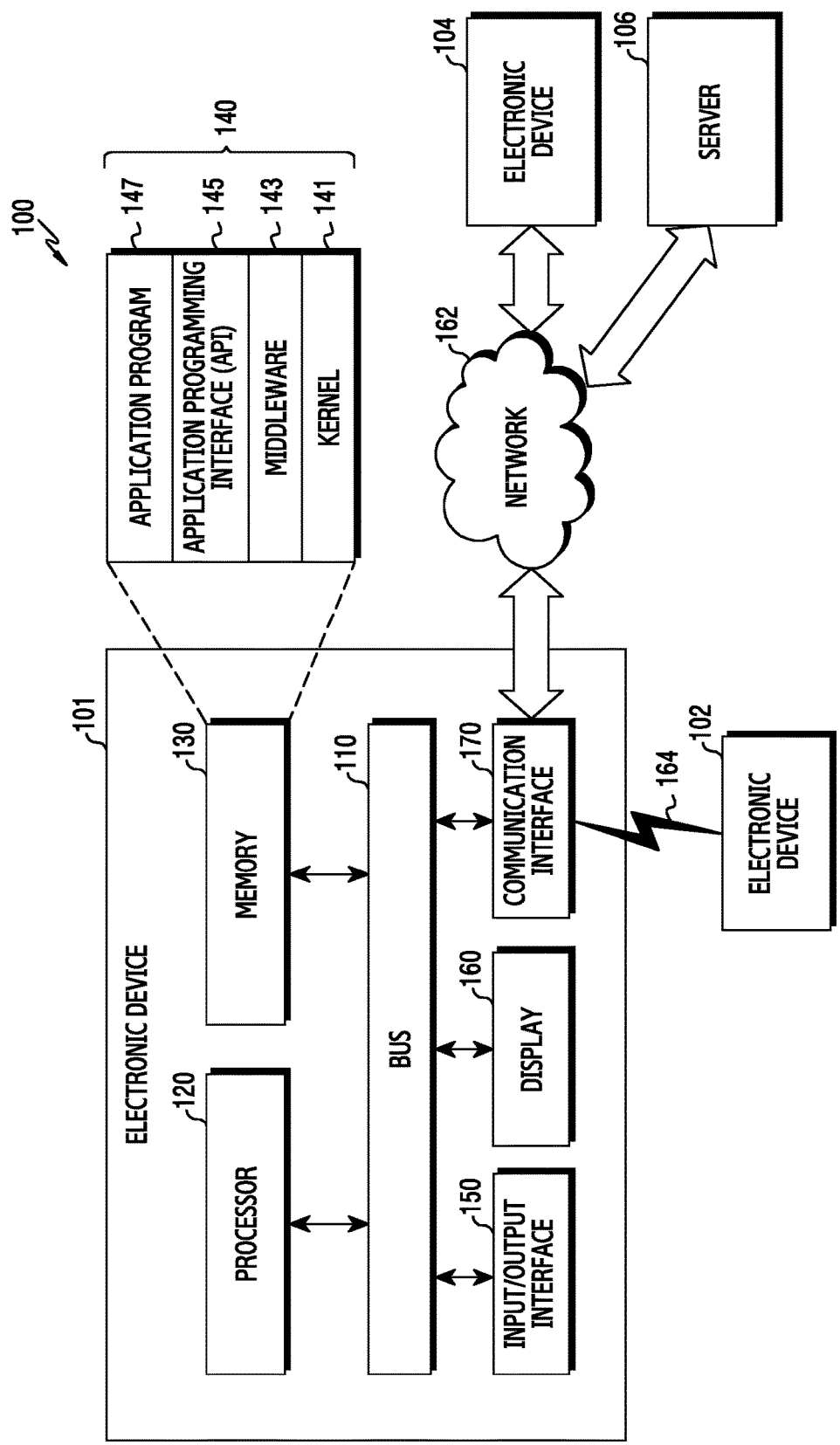
FIG. 1A is a diagram illustrating an example electronic device in a network environment according to various example embodiments.

Hereinafter, various example embodiments of the present disclosure will be described in greater detail with reference to the accompanying drawings. Detailed descriptions of well-known functions and structures incorporated herein may be omitted to avoid obscuring the subject matter of the present disclosure. Further, the terms used herein are defined in consideration of functions of the present disclosure and may vary depending on a user's or an operator's intension and usage. Therefore, the terms used herein should be understood based on the descriptions made herein. In the present disclosure, an expression such as "A or B," "at least one of A or/and B," or "one or more of A or/and B" may include all possible combinations of together listed items. Expressions such as "first," "second," "primarily," or "secondary," used in various example embodiments may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through the other element such as a third element).

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may refer to a situation in which the apparatus "can" operate together with another apparatus or component. For example, a phrase "a processor configured (or set) to perform A, B, and C" may refer, for example, to a dedicated processor, a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to various example embodiments of the present disclosure can include, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit, or the like, but is not limited thereto. The electronic device can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a media box (such as Samsung HomeSync™, Apple TV™, or Google TV™), a game console (such as Xbox™, PlayStation™), an electronic dictionary, an electronic key, a camcorder, and an electronic frame, or the like, but is not limited thereto.

In another embodiment, the electronic device can include at least one of various medical devices (such as various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data recorder (FDR), a vehicle infotainment device, an electronic equipment for ship (such as a navigation device for ship and gyro compass), avionics, a security device, a head unit for a vehicle, an industrial or home robot, a drone, an Automatic Teller's Machine (ATM) of a financial institution, a point of sales (POS) of a store, and Internet of things (such as a bulb, various sensors, a sprinkler device, a fire alarm, a thermostat, a street light, a toaster, a sports equipment, a hot water tank, a heater, and a boiler), or the like, but is not limited thereto. According to an embodiment, the electronic device can include at least one of a portion of furniture, building/construction or vehicle, an electronic board, an electronic signature receiving device, a projector, and various measuring devices (such as water supply, electricity, gas, or electric wave measuring device), or the like, but is not limited thereto. An electronic device according to an embodiment is a flexible electronic device or a combination of two or more of the foregoing various devices. An electronic device according to an embodiment of the present disclosure is not limited to the foregoing devices and includes a new electronic device according to technical development. In this specification, the term "user" can refer to a person using an electronic device or a device using an electronic device (e.g., an artificial intelligent electronic device).

Referring to FIG. 1A, an electronic device 101 may reside in a network 100. The electronic device 101 can include a bus 110, a processor (e.g. including processing circuitry) 120, a memory 130, an input/output (I/O) interface (e.g., including input/output circuitry) 150, a display 160, and a communication interface (e.g., including communication circuitry) 170. The electronic device 101 can omit at least one of the components or further include another component.

The bus 110 can include a circuit for connecting the components 110 to 170 and delivering communication signals (e.g., control messages or data) therebetween.

The processor 120 may include various processing circuitry, such as, for example, and without limitation one or more of a dedicated processor, a central processing unit, an application processor, and a Communication Processor (CP). The processor 120, for example, can perform an operation or data processing on control and/or communication of at least another component of the electronic device 101.

According to an example embodiment, the processor 120 may generate summary information regarding video data. For example, the processor 120 may generate summary information which is formed of a plurality of frames extracted from video data. For example, the processor 120 may determine a layout of a frame according to similarity between extracted frames. According to another embodiment, the processor 120 may adjust a time to reproduce video data based on a frame which is selected by an input from among frames provided as summary information. For example, the processor 120 may reproduce video data at a reproduction time which is determined based on a selected frame or a frame (for example, a previous frame or a next frame) existing within a predetermined range from the selected frame.

The memory 130 can include a volatile and/or nonvolatile memory. The memory 130, for example, can store commands or data relating to at least another component of the electronic device 101. According to one embodiment, the memory 130 may store information necessary for generating summary information regarding video data. For example, the information necessary for generating summary information may include a reference value for determining similarity between frames extracted from video data. According to another embodiment, the memory 130 may store information for adjusting a time to reproduce video data. According to one embodiment, the information for adjusting a time to reproduce video data may include information related to at least one of a start time and a finish time regarding frames extracted from the video data.

According to an example embodiment, the memory 130 can store software and/or a program 140. The program 140, for example, can include a kernel 141, middleware 143, an Application Programming Interface (API) 145, and/or an application program (or "application") 147. At least part of the kernel 141, the middleware 143, or the API 145 can be called an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve as an intermediary role for exchanging data between the API 145 or the application program 147 and the kernel 141 through communication. Additionally, the middleware 132 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control.

The I/O interface 150 may include various circuitry to recognize a user's input. The I/O interface 150 may be a touch input unit. In addition, the I/O interface 150 may be an input/output interface including an output unit. The input/output interface may serve as an interface for delivering a command or data which is inputted from the user or another external device to the other element(s) of the electronic device 101. In addition, the input/output interface may output a command or data which is received from the other element(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. According to one embodiment, the display 160 may output summary information generated by the processor 120. According to various embodiments, the display 160 may output the video data reproduced based on the adjusted time to reproduce video data.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over the network 162 through wireless communication or wired communication. Additionally, the communication interface 170 may establish a communication connection using a short-range wireless communication connection 164 with an external device (e.g., first external electronic device 102).

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UNITS), Wireless Broadband (WiBro), and Global System for Mobile Communications (GSM), as a cellular communication protocol. The wireless communication may include, for example, short-range communication 164. The short-range communication 164 may be conducted by, for example—at least one of WiFi®, Bluetooth®, Bluetooth Low Energy (BLE), Zigbee®, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), BeiDou navigation satellite system (BeiDou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include at least one of telecommunications networks such as computer network (e.g., LAN or WAN), Internet, and telephone network.

Each of the first and second external electronic devices 102 and 104 can be the same or different type of the electronic device 101. According to various embodiments, all or part of operations executed in the electronic device 101 can be executed by another or a plurality of electronic devices (e.g., the electronic device 102 or 104 or the server 106). When the electronic device 101 is to perform a function or service automatically or at the request, instead of performing the function or the service by the electronic device 101 or additionally, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and deliver its result to the electronic device 101. The electronic device 101 can provide the requested function or service by processing the received result as it is or additionally. For doing so, for example, cloud computing, distributed computing, or client-server computing techniques can be used.

Figure 1B:
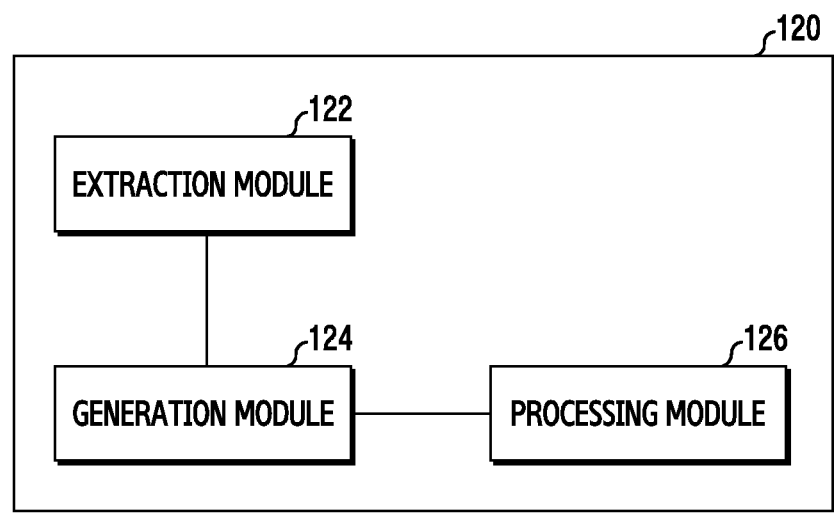
FIG. 1B is a block diagram illustrating an example processor according to various example embodiments of the present disclosure.

FIG. 1B is a block diagram illustrating an example processor, such as, for example, processor 120 according to various example embodiments of the present disclosure.

Referring to FIG. 1B, the processor 120 may include an extraction module (e.g., including processing circuitry and/or program elements) 122, a generation module (e.g., including processing circuitry and/or program elements) 124, and/or a processing module (e.g., including processing circuitry and/or program elements) 126.

According to various embodiments, the extraction module 122 may extract a plurality of frames necessary for generating summary information from video data. According to an example embodiment, the extraction module 122 may extract a predetermined number or more of frames including an object satisfying a condition from video data as frames for generating summary information. For example, the extraction module 122 may extract frames including an object recognized in a first method as frames for generating summary information. For example, the first method is a method which requires relatively less time to recognize an object, and the extraction module 122 may use a face recognition function as the first method. The extraction module 122 may define all frames or at least some frames forming video data as sampling frames, and may extract frames for generating summary information from the sampling frames.

According to various embodiments, the extraction module 122 may determine whether it is possible to generate summary information with the frames extracted in the first method. For example, when a reference number or more of frames (for example, six frames) are extracted in the first method, the extraction module 122 may determine that sufficient frames to generate summary information are extracted. Alternatively, when less than the reference number of frames are extracted in the first method, the extraction module 122 may determine that sufficient frames to generate summary information are not extracted.

According to various embodiments, when it is determined that sufficient frames to generate summary information are not extracted, the extraction module 122 may determine whether it is possible to extract an additional frame for generating summary information. According to one embodiment, when a frame including additional information is identified from at least some frames (for example, three frames) of the sampling frames, the extraction module 122 may determine that it is possible to extract the additional frame. For example, the extraction module 122 may determine whether a frame including additional information recognized in a second method is identified. For example, since the second method is a method which requires more time to recognize an object than the first method, the extraction module 122 may use a facial expression recognition function, an emotion recognition function, and a thing (for example, a region, a building, an animal, or the like) recognition function as the second method.

According to various embodiments, when it is determined that it is possible to extract the additional frame for generating summary information, the extraction module 122 may extract the additional frame for generating summary information. For example, the extraction module 122 may extract the additional frame including the additional information recognized in the second method from among the sampling frames.

According to various embodiments, the generation module 124 may generate summary information regarding the video data using the frames extracted by the extraction module 122. For example, the generation module 124 may measure similarity between the extracted frames and determine a layout regarding the frames. For example, the similarity may be related to the number of objects included in the frame or the size of the object. For example, the layout may be related to the size or location of the frame.

According to an example embodiment, the generation module 124 may determine a layout such that only the frames having similarity greater than or equal to a reference value are provided as summary information from among the extracted frames. For example, when six frames out of 10 extracted frames have similarity greater than or equal to the reference value, the generation module 124 may generate summary information using only the six frames having the similarity greater than or equal to the reference value. In this case, the generation module 124 may determine a layout such that the six frames are arranged on a region where summary information is to be displayed in the same size.

According to another embodiment, the generation module 124 may determine a layout to distinguish between the frames having similarity greater than or equal to the reference value and the frames having similarity less than the reference value from among the extracted frames. For example, when six frames out of 10 extracted frames have similarity greater than or equal to the reference value, the generation module 124 may apply a first layout to the six frames having the similarity greater than or equal to the reference value, and may apply a second layout to the other frames. For example, the first layout may have a larger size than the second layout.

According to still another embodiment, the generation module 124 may determine a layout for the frames based on frame information (for example, a sequence). For example, the generation module 124 may identify an interval between each of the extracted frames and a previous frame, and may apply the first layout to a frame having the longest interval and apply the second layout to the other frames.

According to various embodiments, the processing module 126 may display the summary information generated by the generation module 124 on a screen. The processing module 126 may reproduce the video data based on an input on the summary information. According to an example embodiment, the processing module 126 may determine a time to reproduce the video data based on a frame corresponding to the input from among the frames displayed as the summary information. For example, the processing module 126 may process the video data to be reproduced from a start point which is determined based on the selected frame.

According to various embodiments, the extraction module 122 may use a frame including audio information satisfying a condition from among the frames forming the video data in generating the summary information. For example, the extraction module 122 may use a frame from which a defined voice print is recognized using voice print recognition in generating the summary information. In another example, the extraction module 122 may analyze audio information and may use a frame from which a change in a speaker is identified in generating the summary information.

Figure 2:
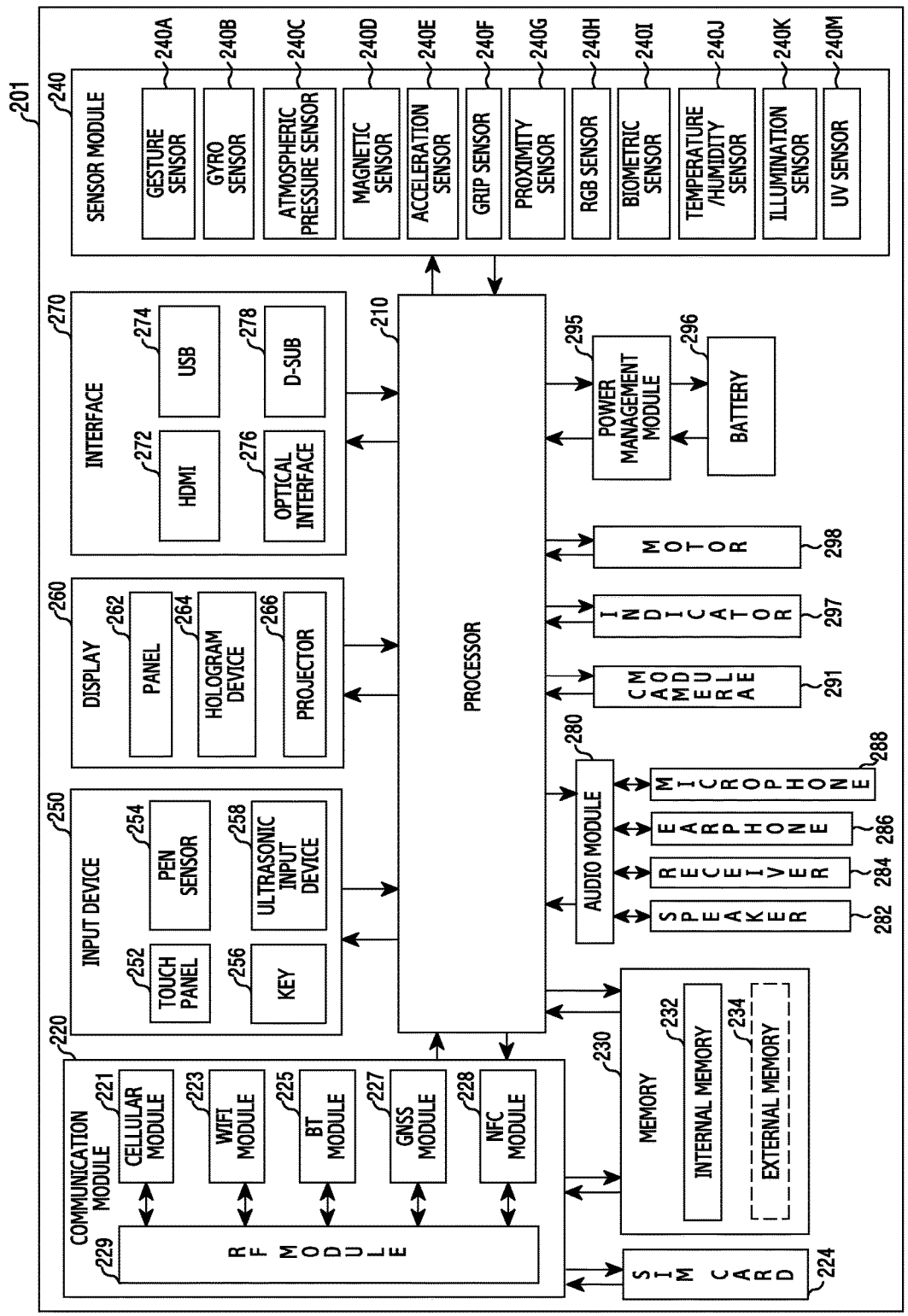
FIG. 2 is a block diagram illustrating an example electronic device according to various example embodiments of the present disclosure.

FIG. 2 is a block diagram illustrating an example electronic device 201 according to various example embodiments of the present disclosure.

The electronic device 201 may configure, for example, all or a portion of the electronic device 101 illustrated in FIG. 1A. Referring to FIG. 2, the electronic device 201 may include one or more processors (e.g., AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, or a motor 298.

The processor 210 may include various processing circuitry to drive an OS or an application to control a plurality of hardware or software elements connected to the processor 210, and perform various data processes including multimedia data and operations. The processor 210 may be implemented, for example, as a system on chip (SoC). According to an embodiment, the processor 210 may further include at least one of a graphic processing unit (GPU) or image signal processor. According to an embodiment, the processor 210 may be implemented to include at least a portion (e.g., the cellular module 221) of the above-described elements. Also, the processor 210 may stores data received from at least one of other elements or generated by at least one of other elements in a non-volatile memory.

The communication module 220 (e.g., the communication interface 160) may include various communication circuitry to perform data transmission/reception in communication between the electronic device 201 (e.g., the electronic device 21) and other electronic devices (e.g., the electronic device 24 or the server 26) connected via a network. According to an example embodiment, the communication module 220 may include various communication circuitry, such as, for example, and without limitation, a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the processor 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the processor 210 in FIG. 2, according to an embodiment, the processor 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 (e.g., the memory 20) may include a built-in (e.g., internal) memory 232 and/or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., RGB (red, green, blue) sensor), a living body (e.g., biometric) sensor 240I, a temperature/humidity sensor 240J, an illuminance (e.g., illumination or light) sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include various input circuitry, such as, for example, and without limitation, a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 160 illustrated in FIG. 1A. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1A. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the processor 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various example embodiments of the present disclosure may comprise one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
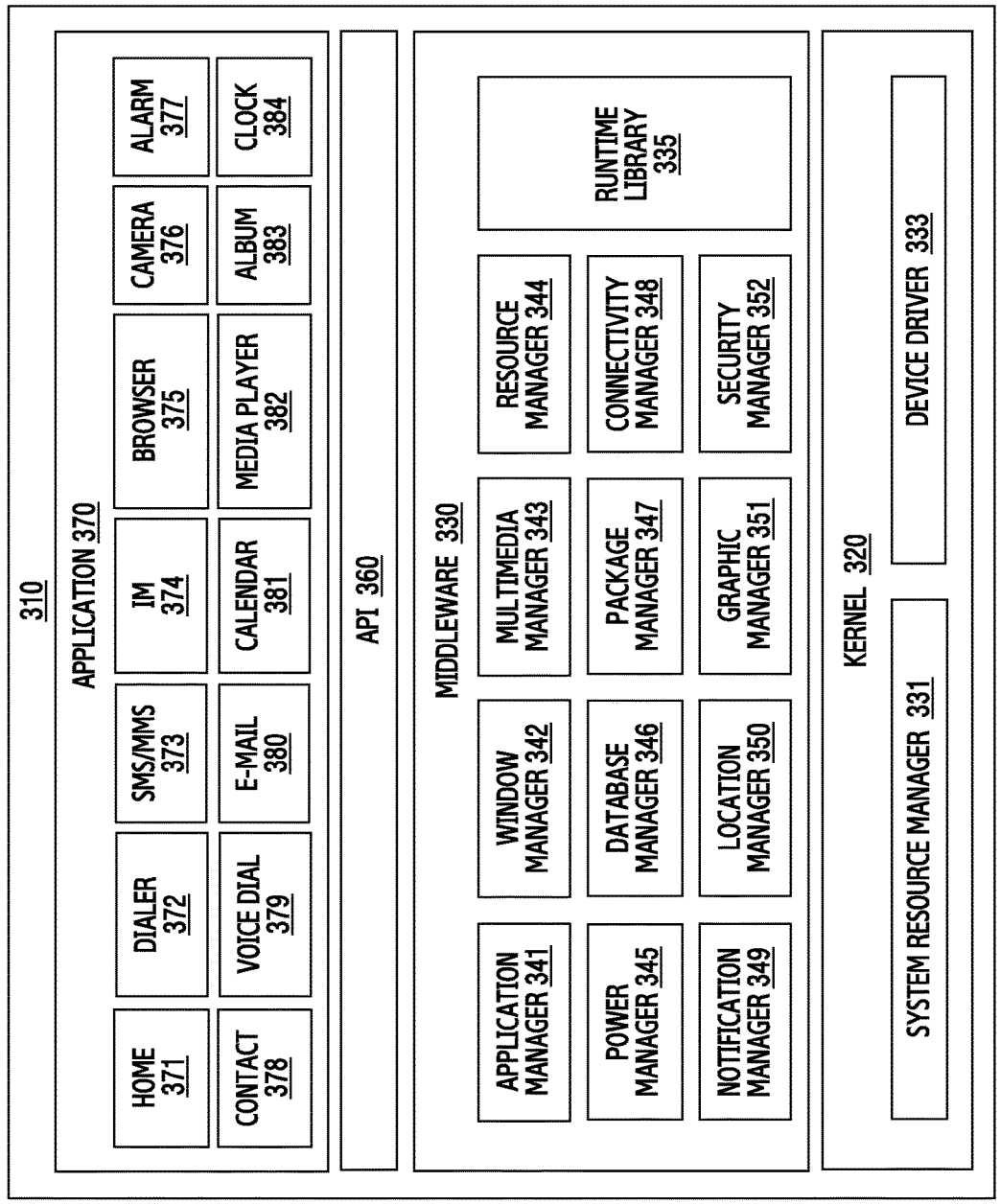
FIG. 3 is a block diagram illustrating an example program module according to various example embodiments of the present disclosure.

FIG. 3 is a block diagram illustrating an example program module 310 according to various example embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android™, iOS™, Windows™, Symbian™, Tizen™, Bada™, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1A) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384. Additionally or alternatively, though not shown, the applications 370 may include other applications including, for example, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

The term "module" as used herein may, for example, refer, for example, to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include, for example, and without limitation, at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, an electronic device may include a display and a processor electrically connected with the display. According to one embodiment, the processor may be configured to extract a plurality of frames from video data, identify at least one of a size of an object included in each of the extracted frames and a number of objects included in each of the extracted frames, determine a layout regarding each of the extracted frames based on the size of the object and the number of objects, and display the extracted frames on the display to correspond to the layout.

According to an example embodiment, the layout may include at least one of a size of a frame and a display location of a frame.

According to an example embodiment, the processor may be configured to display a frame including a reference number or more of objects according to a first layout. For example, the first layout may include a layout for highlighting frames to be distinguished from frames of a second layout.

According to an example embodiment, the processor may be configured to display a frame including an object having a size greater than or equal to a reference size according to a first layout.

According to an example embodiment, the processor may be configured to display a frame including an object related to a specified photographing mode according to a first layout.

According to an example embodiment, the processor is configured to display a frame including audio information satisfying a condition according to a first layout. For example, the audio information satisfying the condition may include at least one of a change in an emotion and a change in a speaker.

According to an example embodiment, the processor may be configured to display a frame having a time interval greater than or equal to a reference time according to a first layout.

According to an example embodiment, the processor may be configured to display the extracted frames based on a time sequence of the frames.

According to an example embodiment, in response to at least one frame being selected from among the frames displayed on the display, the processor may be configured to determine a time to reproduce the video data based on the selected frame.

According to an example embodiment, the processor may extract a plurality of frames from the video data using a first method. For example, the first method may include a face recognition function.

According to an example embodiment, when the number of frames extracted in the first method is less than a reference number, the processor may extract a plurality of additional frames from the video data using a second method. For example, the second method may include a thing recognition function.

According to various example embodiments of the present disclosure, an electronic device may include: a housing;

a touch screen display exposed through a part of the housing; a camera exposed through a part of the housing; a wireless communication circuit included in the housing; a processor electrically connected with the display, the camera, and the wireless communication circuit; and a memory electrically connected with the processor and configured to store video data including a plurality of frames. According to an example embodiment, the memory may store instructions that, when executed, cause the processor to recognize a human face and/or an animal included in at least a part of the plurality of frames, to classify the plurality of frames into at least one group based on the recognized face and/or animal, to select a plurality of frames from the at least one group, and to arrange the selected plurality of frames and display the selected plurality of frames on the display simultaneously.

According to an example embodiment, the instructions, when executed by the processor, may cause the processor to randomly select some of the plurality of frames and then to recognize a face and/or an animal included in the selected frames.

Figure 4:
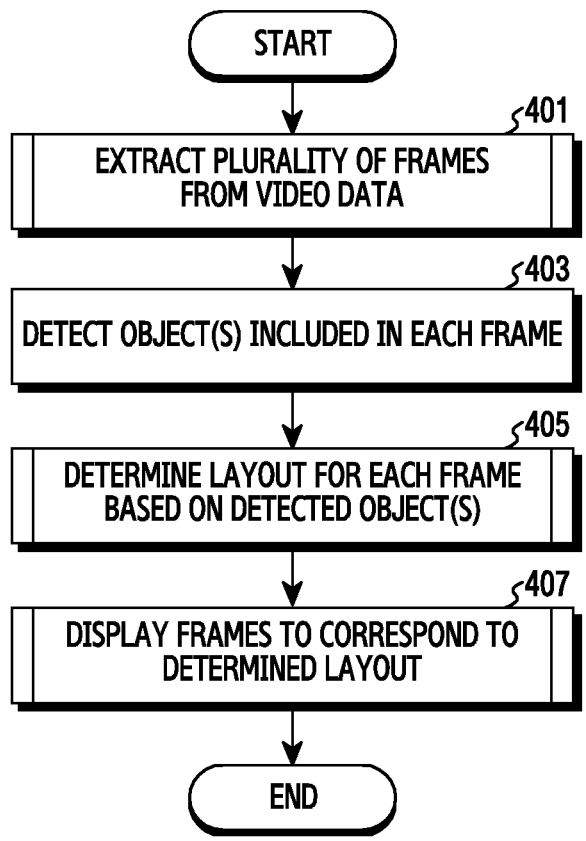
FIG. 4 is a flowchart illustrating an example operation of generating summary information regarding video data in the electronic device 101 according to various example embodiments of the present disclosure.

FIG. 4 is a flowchart illustrating an example operation of generating summary information regarding video data in the electronic device 101 according to various example embodiments of the present disclosure.

Referring to FIG. 4, in operation 401, the electronic device 101 may extract a plurality of frames from video data. For example, the electronic device 101 may extract a reference number or more of frames including objects satisfying a condition from among a plurality of frames forming the video data. For example, the electronic device 101 may extract frames including a face, an animal, a characteristic building, or the like as frames including objects satisfying a condition. In another example, the electronic device 101 may extract a reference number or more of frames including audio information satisfying a condition from among the plurality of frames forming the video data. For example, the electronic device 101 may extract a frame corresponding to a point of time at which a change in an emotion occurs, a frame corresponding to a point of time at which a speaker is changed, or the like. The electronic device 101 may extract a frame selected according to specified rules or a frame arbitrarily selected from among the frames forming the video data.

In operation 403, the electronic device 101 may detect objects included in the extracted frames. For example, the electronic device 101 may detect objects included in the frames and may analyze the characteristics of the objects. For example, the characteristics of the objects may include the number of objects, the size of the object, or the like.

In operation 405, the electronic device 101 may determine a layout regarding the frames based on the detected objects. For example, the electronic device 101 may determine a layout such that only the frames having similarity greater than or equal to a reference value from among the extracted frames is provided as summary information. In another example, the electronic device 101 may determine a layout such that frames having similarity of a predetermined level from among the extracted frames are highlighted to be distinguished from the other frames not having the similarity of the predetermined level. In still another example, the electronic device 101 may determine a layout such that the extracted frames are provided in a time sequence.

In operation 407, the electronic device 101 may display the extracted frames on a screen (for example, the display) to correspond to the determined layout. For example, the electronic device 101 may provide the extracted plurality of frames as summary information regarding the video data.

Figure 5:
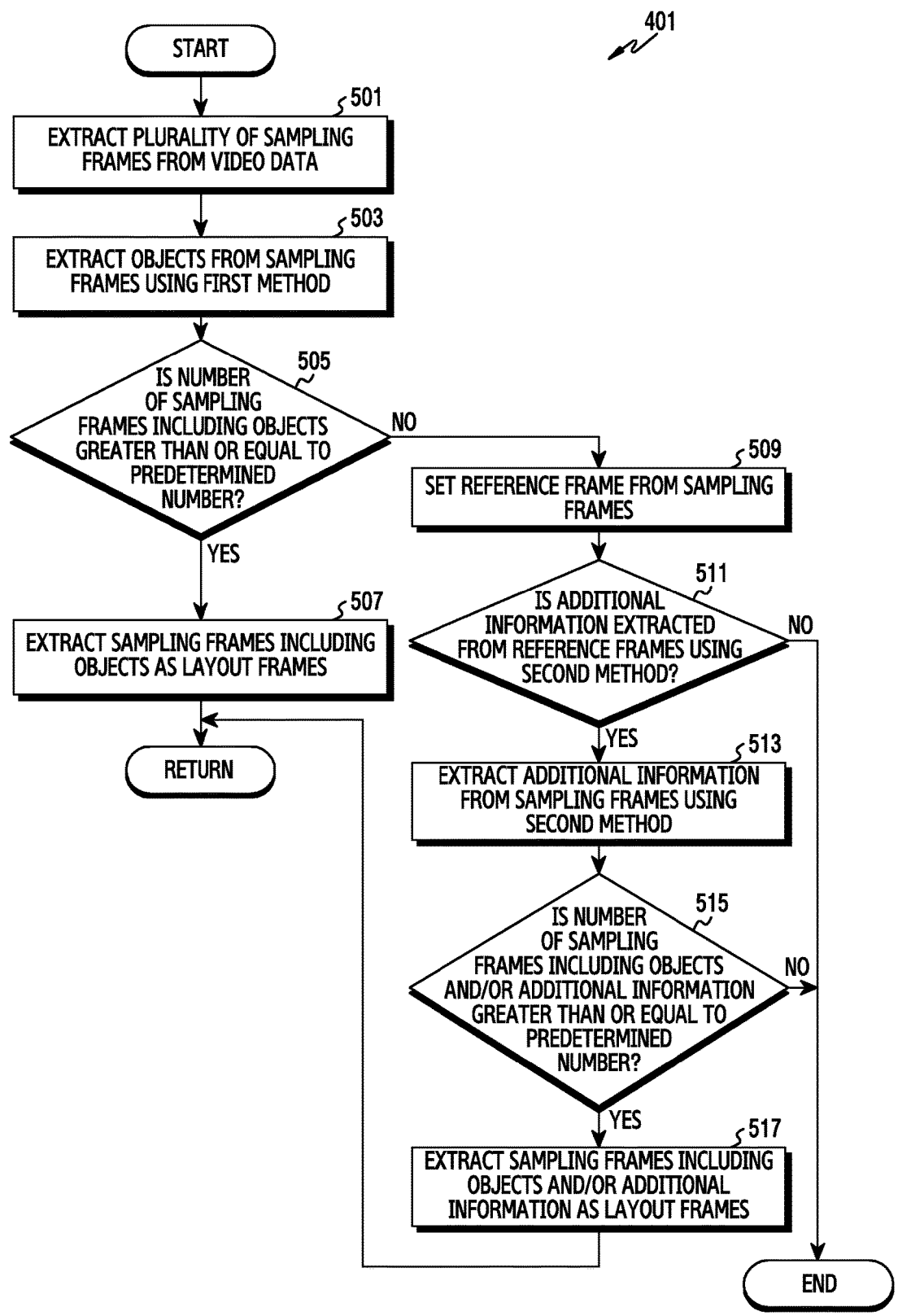
FIG. 5 is a flowchart illustrating an example frame extraction operation of the electronic device 101 according to various example embodiments of the present disclosure.
Figure 6:
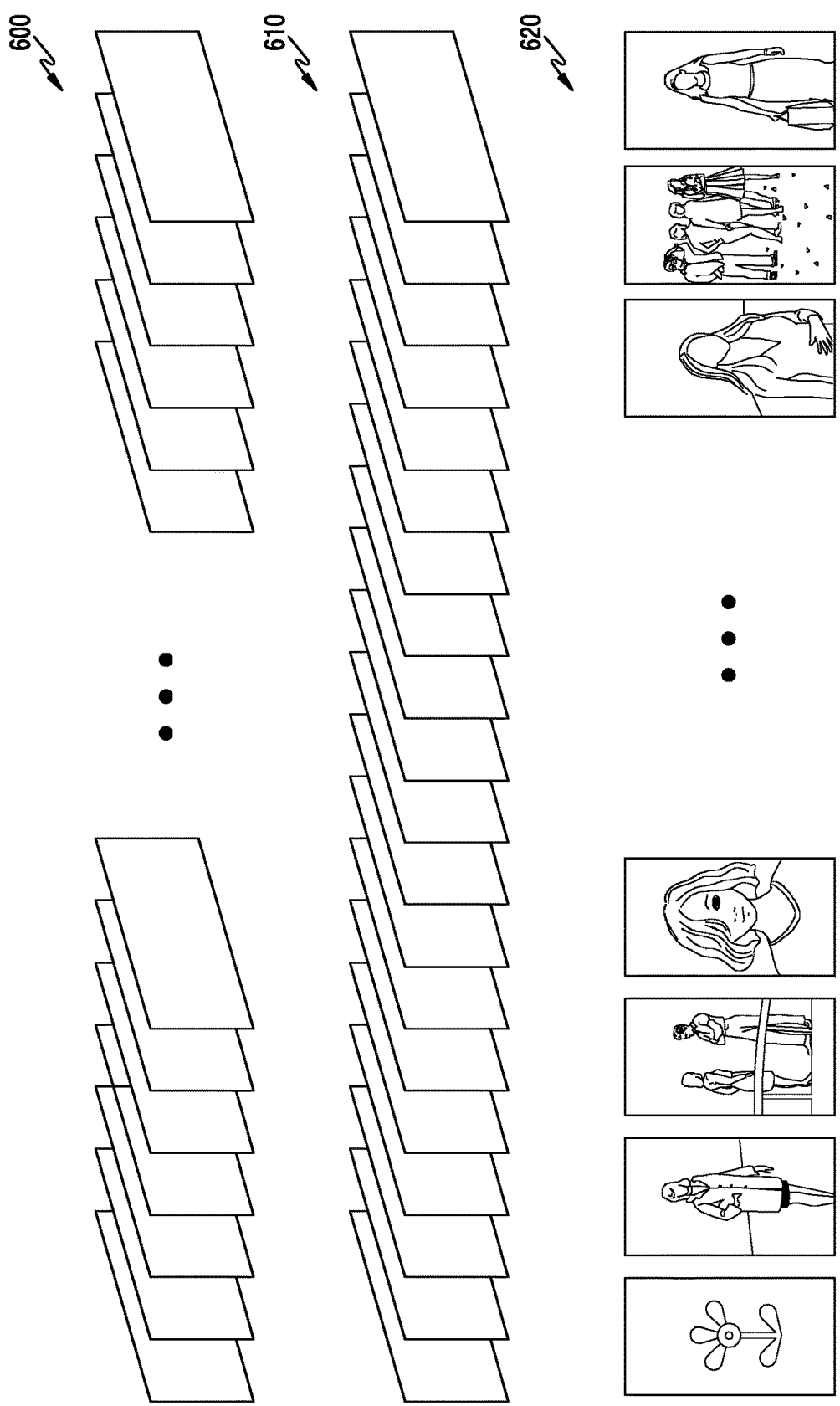
FIG. 6 is a diagram illustrating an example of the frame extraction operation according to various example embodiments of the present disclosure.
Figure 7:
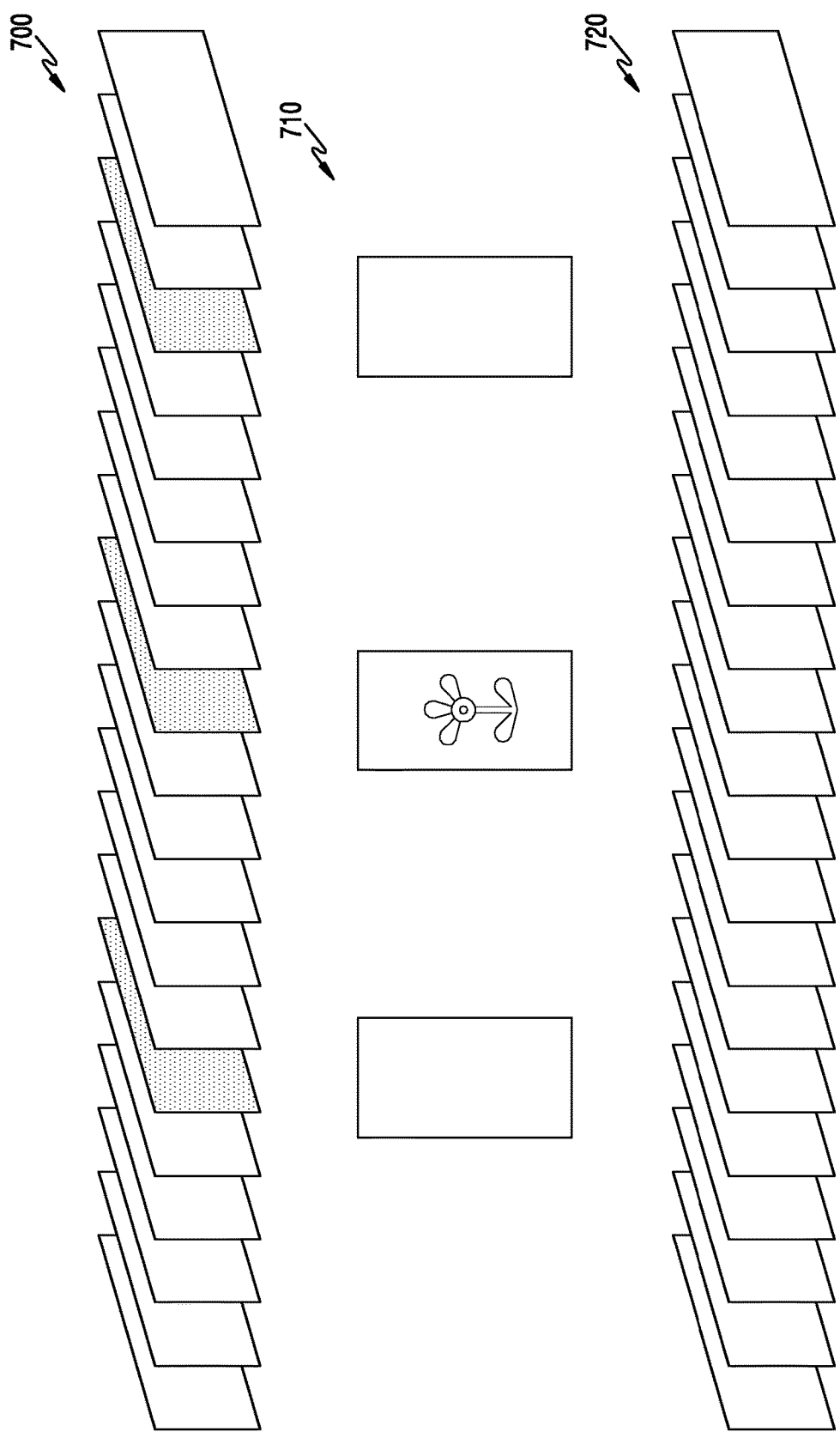
FIG. 7 is a diagram illustrating an example additional information extraction operation of in the electronic device 101 according to various example embodiments of the present disclosure.

FIG. 5 is a flowchart illustrating an example frame extraction operation of the electronic device 101 according to various example embodiments of the present disclosure. In addition, FIG. 6 is a diagram illustrating an example of the frame extraction operation according to various example embodiments of the present disclosure, and FIG. 7 is a diagram illustrating an example of an additional information extraction operation according to various example embodiments of the present disclosure. According to an example embodiment, the electronic device 101 may be the processor 120 of the electronic device 101.

According to various example embodiments, the frame extraction operation may be a detailed operation of operation 401 illustrated in FIG. 4.

Referring to FIG. 5, in operation 501, the electronic device 101 may extract a plurality of sampling frames from video data. For example, the electronic device 101 may extract at least some frames of the video data as sampling frames. For example, the electronic device 101 may extract sampling frames arranged at a regular interval (for example, a frame interval or a time interval) or a predetermined number of sampling frames (for example, 20 sampling frames), as indicated by reference numeral 610 of FIG. 6, from total frames (for example, 600 frames) of video data (for example, video data of 20 seconds of 30 fps) as indicated by reference numeral 600 of FIG. 6. For example, the electronic device 101 may extract one frame at an interval of 30 frames, that is, 20 sampling frames in total. In another example, the electronic device 101 may extract one frame every one second, that is, 20 sampling frames in total. In addition, in the case of video data (for example, video data of 20 minutes of 30 fps), the electronic device 101 may extract one frame every one minute or at an interval of 1800 frames, that is, 20 sampling frames in total.

According to various embodiments, the electronic device 101 may not extract a frame which is less likely to include a meaningful object as a sampling frame. For example, the electronic device 101 may not use at least the first frame and the laser frame of the video data as sampling frames. In another example, the electronic device 101 may not use a frame which has a quality less than or equal to a reference quality as a sampling frame. For example, the reference quality may include at least one of a resolution, sharpness, brightness, or a degree of shaking of a frame.

In operation 503, the electronic device 101 may extract an object from the sampling data using a first method. For example, the electronic device 101 may extract an object using the first method which requires less cost (for example, a memory, a time, complexity, or the like) to recognize an object. For example, the electronic device 101 may extract a face from objects included in each sampling frame (for example, each of the 20 sampling frames) as indicated by reference numeral 620 of FIG. 6 using a face recognition function as the first method.

In operation 505, the electronic device 101 may identify the number of the sampling frames including the objects. For example, the electronic device 101 may determine whether the number of the sampling frames including the objects is greater than or equal to a predetermined number (or a reference number). For example, the predetermined number may be a reference value for determining whether sufficient frames to generate summary information are extracted. When the number of the sampling frames including the objects is greater than or equal to the predetermined number, the electronic device 101 may determine that sufficient frames to generate summary information are extracted. On the other hand, when the number of the sampling frames including the objects is less than the predetermined number, the electronic device 101 may determine that sufficient frames to generate summary information are not extracted.

When the number of the sampling frames including the objects is greater than or equal to the predetermined number, the electronic device 101 may extract the sampling frames including the objects as layout frames in operation 507. For example, the layout frame may be defined as a frame to be used as summary information.

When the number of the sampling frames including the objects is less than the predetermined number, the electronic device may set a reference frame from among the sampling frames in operation 509. The reference frame may be a frame which is used to determine whether to perform an additional information extraction operation. For example, as indicated by reference numeral 700 of FIG. 7, the electronic device 101 may set some of the sampling frames (for example, sampling frames) as reference frames (for example, three shaded frames). In another example, the electronic device 101 may set a plurality of reference frames from among the sampling frames including the objects.

In operation 511, the electronic device 101 may determine whether additional information is extracted from the reference frames using a second method. For example, the second method may be a method which requires more cost (for example, a memory, a time, complexity, or the like) to recognize an object than the first method. For example, the electronic device 101 may determine whether objects (for example, a place, a building, an animal, or the like) which are different from the objects extracted in the first method are extracted from the reference frames. In another example, the electronic device 101 may determine whether characteristics (for example, a facial expression, an emotion, a specified user, or the like) of the objects extracted in the first method are extracted from the reference frames. When additional information (for example, a flower) is extracted from at least one reference frame from among the reference frames (for example, three reference frames) as indicated by reference numeral 710 of FIG. 7, the electronic device 101 may determine that it is possible to extract the additional information. On the other hand, when additional information is not extracted from the reference frames, the electronic device 101 may determine that it is impossible to extract additional information.

When additional information is not extracted from the reference frames, the electronic device 101 may stop the operation of generating the summary information regarding the video data. Alternatively, the electronic device 101 may provide summary information by using one frame included in the video data as a thumbnail image.

When additional information is extracted from the reference frames, the electronic device 101 may extract the additional information from the sampling frames using the second method in operation 513. For example, when it is determined that the additional information exists through the reference frames, the electronic device 101 may extend an additional information extraction range to the sampling frames (for example, 20 sampling frames) in order to extract a variety of additional information as indicated by reference numeral 720 of FIG. 7.

In operation 515, the electronic device 101 may determine whether the number of the sampling frames including the objects and/or the additional information is greater than or equal to a predetermined number. When the number of the sampling frames including the objects is greater than or equal to the predetermined number, the electronic device 101 may determine that sufficient frames to generate summary information are extracted. On the other hand, when the number of the sampling frames including the objects is less than the predetermined number, the electronic device 101 may determine that sufficient frames to generate summary information are not extracted.

When the number of the sampling frames including the objects or additional information is greater than or equal to the predetermined number, the electronic device 101 may extract the sampling frames including the objects and/or additional information as layout frames in operation 517.

When the number of the sampling frames including the objects or additional information is less than the predetermined number, the electronic device 101 may stop the operation of generating the summary information regarding the video data. Alternatively, the electronic device 101 may provide summary information by using one frame included in the video data as a thumbnail image.

Figure 8:
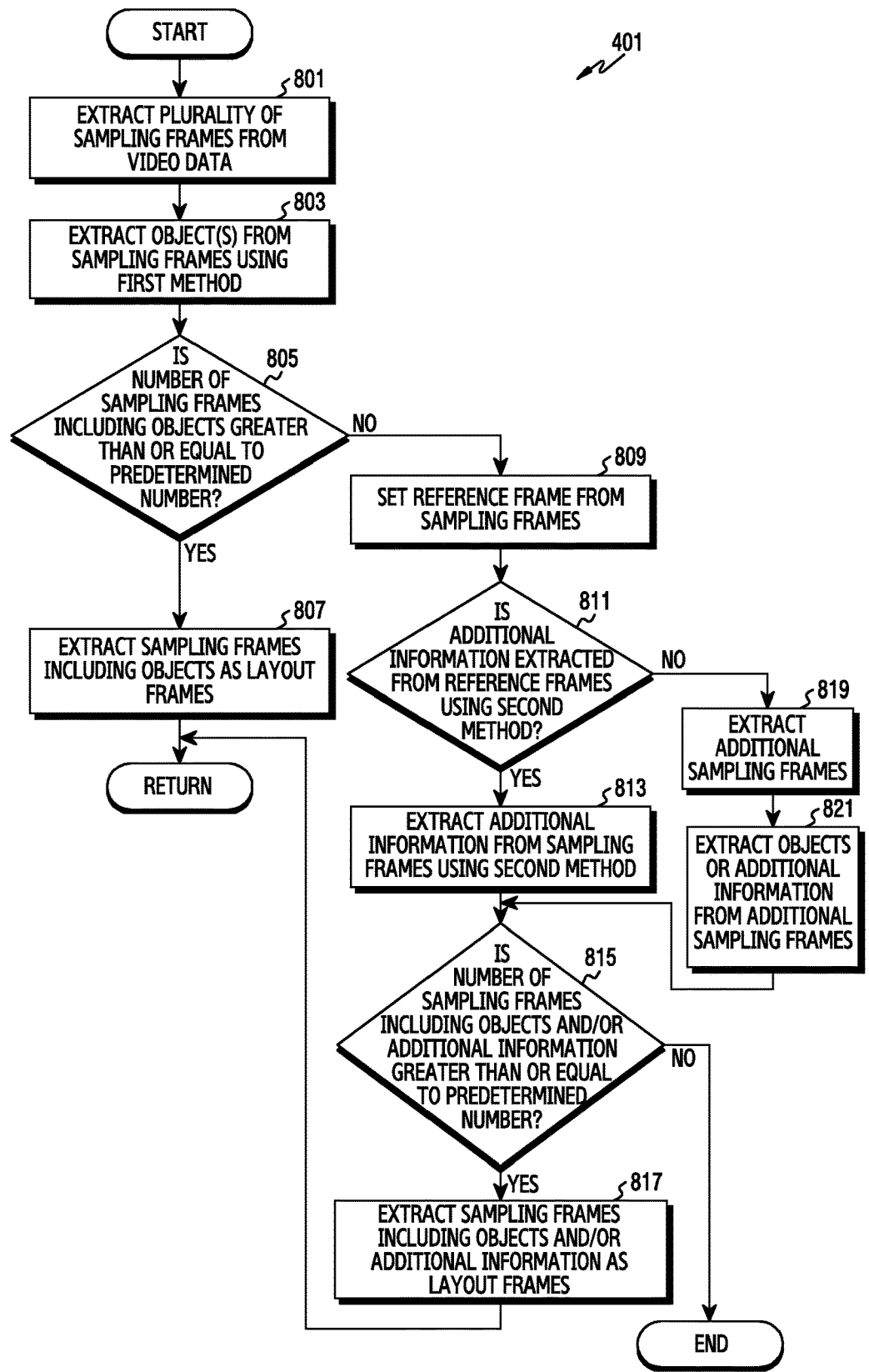
FIG. 8 is a flowchart illustrating an example of an additional information extraction operation according to various example embodiments of the present disclosure.

FIG. 8 is a flowchart illustrating another example operation of extracting frames in the electronic device 101 according to various example embodiments of the present disclosure. According to various example embodiments, the frame extraction operation may be a detailed operation of operation 401 illustrated in FIG. 4. In addition, descriptions of FIG. 8 that are the same as, or similar to, those of FIG. 5 may not be repeated.

Referring to FIG. 8, in operation 801, the electronic device 101 may extract a plurality of sampling frames from video data. For example, the electronic device 101 may extract at least some frames of the video data as sampling frames. For example, the electronic device 101 may extract sampling frames arranged at a regular interval (for example, a frame interval or a time interval) or a predetermined number of sampling frames (for example, 20 sampling frames) from total frames (for example, 600 frames) of video data (for example, video data of 20 seconds of 30 fps). According to various embodiments, the electronic device 101 may not extract a frame which is less likely to include a meaningful object as a sampling frame.

In operation 803, the electronic device 101 may extract an object from the sampling data using the first method. For example, the electronic device 101 may extract an object using the first method which requires less cost (for example, a memory, a time, complexity, or the like) to recognize an object.

In operation 805, the electronic device 101 may identify the number of the sampling frames including the objects. For example, the electronic device 101 may determine whether the number of the sampling frames including the objects is greater than or equal to a predetermined number (or a reference number). For example, the predetermined number may be a reference value for determining whether sufficient frames to generate summary information are extracted.

When the number of the sampling frames including the objects is greater than or equal to the predetermined number, the electronic device 101 may extract the sampling frames including the objects as layout frames in operation 807. For example, the layout frame may be defined as a frame to be used as summary information.

When the number of the sampling frames including the objects is less than the predetermined number, the electronic device may set a reference frame from among the sampling frames in operation 809. The reference frame may be a frame which is used to determine whether to perform an additional information extraction operation.

In operation 811, the electronic device 101 may determine whether additional information is extracted from the reference frames using the second method. For example, the second method may be a method which requires more cost (for example, a memory, a time, complexity, or the like) to recognize an object than the first method.

When additional information is extracted from the reference frames, the electronic device 101 may extract the additional information from the sampling frames using the second method in operation 813. For example, when it is determined that the additional information exists through the reference frames, the electronic device 101 may extend an additional information extraction range from the reference frames to the sampling frames in order to extract a variety of additional information.

In operation 815, the electronic device 101 may determine whether the number of the sampling frames including the objects and/or additional information is greater than or equal to a predetermined number. When the number of the sampling frames including the objects is greater than or equal to the predetermined number, the electronic device 101 may determine that sufficient frames to generate summary information are extracted. On the other hand, when the number of the sampling frames including the objects is less than the predetermined number, the electronic device 101 may determine that sufficient frames to generate summary information are not extracted.

When the number of the sampling frames including the objects or additional information is greater than or equal to the predetermined number, the electronic device 101 may extract the sampling frames including the objects and/or additional information as layout frames in operation 817.

When the number of the sampling frames including the objects or additional information is less than the predetermined number, the electronic device 101 may stop the operation of generating the summary information regarding the video data. Alternatively, the electronic device 101 may provide summary information by using one frame included in the video data as a thumbnail image.

When additional information is not extracted from the reference frames, the electronic device 101 may extract an additional sampling frame in operation 819. For example, the electronic device 101 may increase the number of the sampling frames to increase the number of the frames to be used for generating summary information. For example, the electronic device 101 may extract a sampling frame existing within a predetermine range from at least one layout frame extracted in the first method (for example, a frame existing before or after the layout frame) as an additional sampling frame.

In operation 821, the electronic device 101 may extract an object from the additional sampling frame. For example, the electronic device 101 may extract an object or additional information included in the additional sampling frame using at least one of the first method or the second method.

When the object or additional information included in the additional sampling frame is extracted, the electronic device 101 may identify the number of the sampling frames including the object and/or additional information, and extract the sampling frames including the objects and/or additional information as layout frames. For example, after extracting the object or additional information included in the additional sampling frame, the electronic device 101 may perform an operation related to operations 815 and 817. In addition, when the object or additional information is not extracted from the additional sampling frame, the electronic device 101 may stop the operation of generating the summary information regarding the video data.

Figure 9:
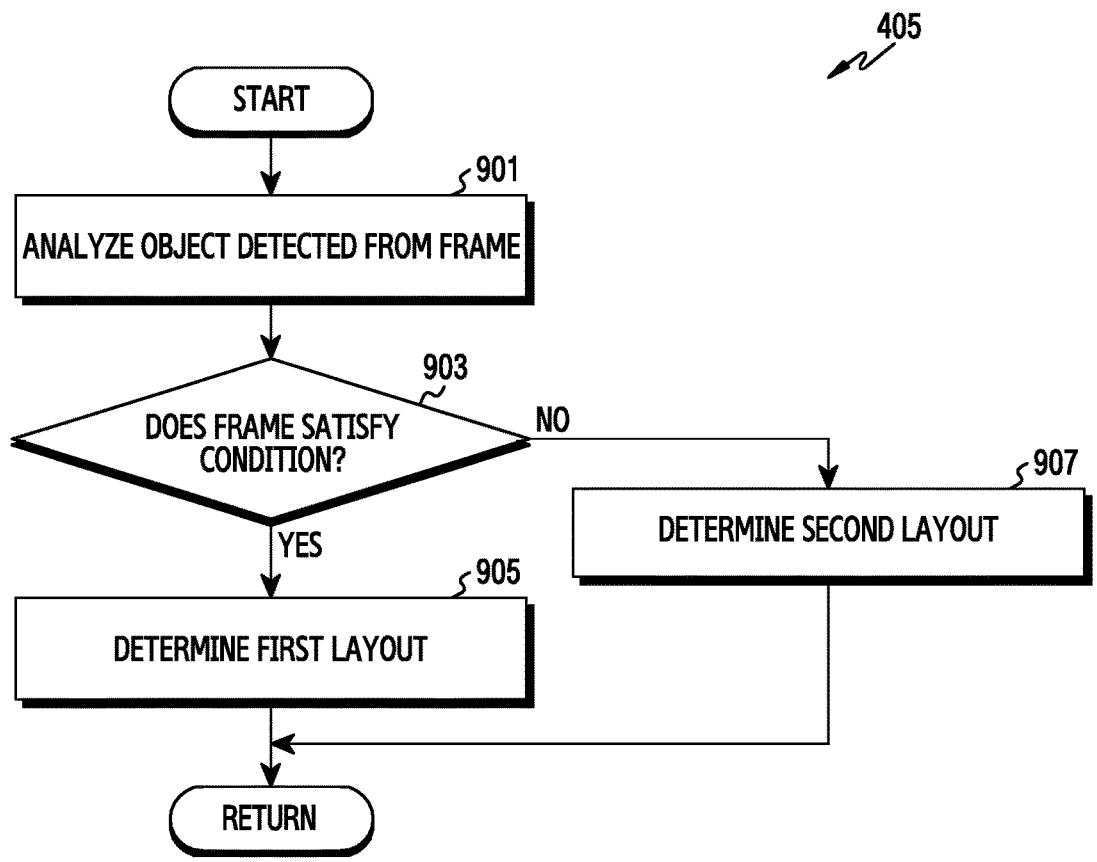
FIG. 9 is a flowchart illustrating an example layout determination operation according to various example embodiments of the present disclosure.
Figure 10:
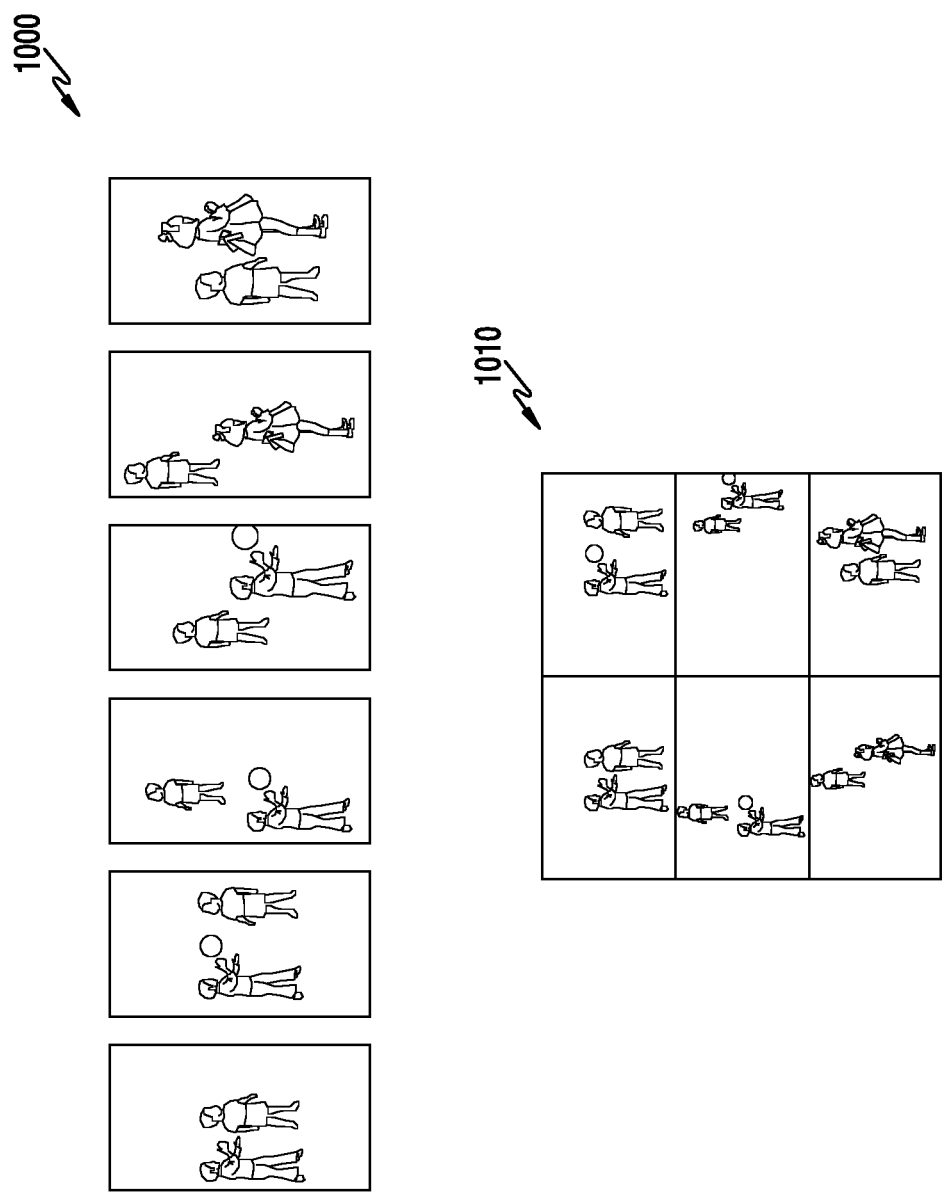
FIGS. 10 and 11 are diagrams illustrating examples of the layout determination operation according to various example embodiments of the present disclosure.
Figure 11:
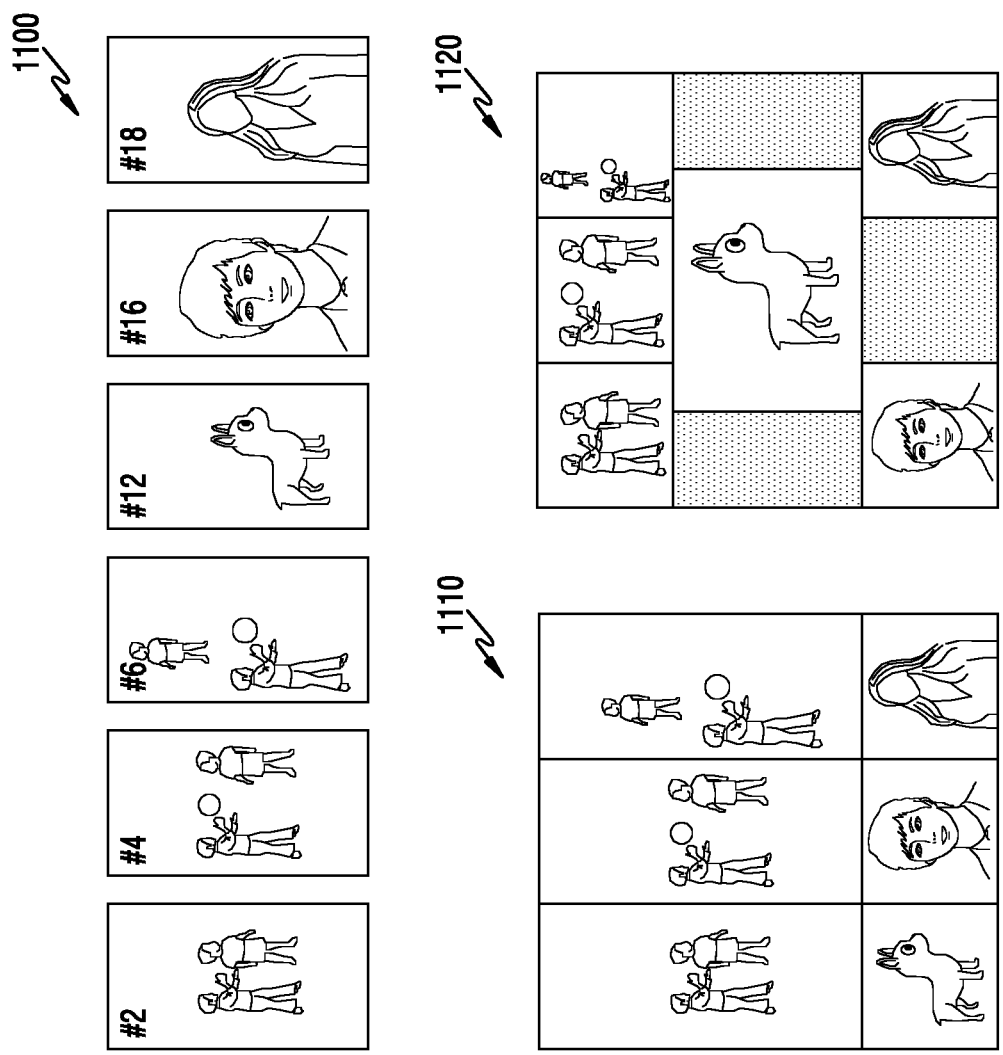

FIG. 9 is a flowchart illustrating an example layout determination operation of the electronic device 101 according to various example embodiments of the present disclosure. In addition, FIGS. 10 and 11 are diagrams illustrating an example of the layout determination operation according to various example embodiments of the present disclosure.

According to various example embodiments, the layout determination operation may be a detailed operation of operation 405 illustrated in FIG. 4.

Referring to FIG. 9, in operation 901, the electronic device 101 may analyze an object detected from a frame. For example, the electronic device 101 may determine the number of objects detected from each frame, the size of the object, or a photographing mode regarding the object by analyzing the object.

In operation 903, the electronic device 101 may determine whether the frame including the object satisfies a condition based on a result of analysis. For example, the electronic device 101 may determine that the condition is satisfied when the frame including the object has similarity greater than or equal to a reference value with another frame. For example, the electronic device 101 may measure similarity based on a frame sequence, and may determine that the condition is satisfied when adjacent frames are similar to each other. In another example, the electronic device 101 may determine that the condition is satisfied when a time difference between a current frame including an object and a previous frame including an object is greater than or equal to a predetermined time. In still another example, the electronic device 101 may determine that the condition is satisfied when an object having a size larger than or equal to a reference size is detected from a current frame. In yet another example, the electronic device 101 may determine that the condition is satisfied when a reference number or more of objects are detected from a current frame. In further example, the electronic device 101 may determine that the condition is satisfied when an object photographed in a specified photographing mode is extracted.

When it is determined that the frame satisfies the condition, the electronic device 101 may determine a first layout as a layout of the frame from which the object is detected in operation 905. For example, the electronic device 101 may process the frame satisfying the condition to be highlighted and distinguished from the other frames using the first layout.

When it is determined that the frame does not satisfy the condition, the electronic device 101 may determine a second layout as a layout of the frame from which the object is detected. For example, the electronic device 101 may determine the second layout to have a smaller size than the first layout.

For example, when frames have similarity greater than or equal to a reference value as illustrated in FIG. 10, the electronic device 101 may process the frames 1000 having similarity greater than or equal to the reference value to be displayed according to the first layout (1010). For example, the electronic device 101 may process the frames to be displayed according to the first layout based on a time sequence of the frames. In FIG. 10, a layout is determined such that frames including similar objects (for example, people) are arranged in the same size.

In another example, as illustrated in FIG. 11, the electronic device 101 may process frames including a reference number or more of objects from among extracted frames (for example, layout frames) 1100 to be displayed according to the first layout, and process the other frames including less than the reference number of objects to be displayed according to the second layout (1110). In FIG. 11, the $2^{nd}$ frame, the $4^{th}$ frame, and the $6^{th}$ frame of video data include the reference number or more of objects, and the $12^{th}$ frame, the $16^{th}$ frame, and the $18^{th}$ frame include less than the reference number of objects. The $2^{nd}$ frame, the $4^{th}$ frame, and the $6^{th}$ frame including the reference number or more of objects are displayed according to the first layout and are highlighted to be distinguished from the other frames (for example, the $12^{th}$ frame, the $16^{th}$ frame, and the $18^{th}$ frame).

In still another example, as shown in FIG. 11, the electronic device 101 may process a frame having a great time difference from another frame to be displayed according to the first layout (1120). In FIG. 11, there is the greatest time difference between the $6^{th}$ frame and the $12^{th}$ frame (for example, a six-frame time difference), and the $12^{th}$ frame having the greatest time difference is displayed according to the first layout and is highlighted to be distinguished from the other frames. Alternatively, the electronic device 101 may classify frames having similarity greater than or equal to a reference value into one group, and may process the group to be displayed according to the same layout.

In yet another example, the electronic device 101 may process a frame related to a specific photographing mode from among the extracted frames (for example, layout frames) 1100 to be displayed according to the first layout. For example, the electronic device 101 may process a frame including an object photographed in a selfie mode to be displayed according to the first layout.

Figure 12:
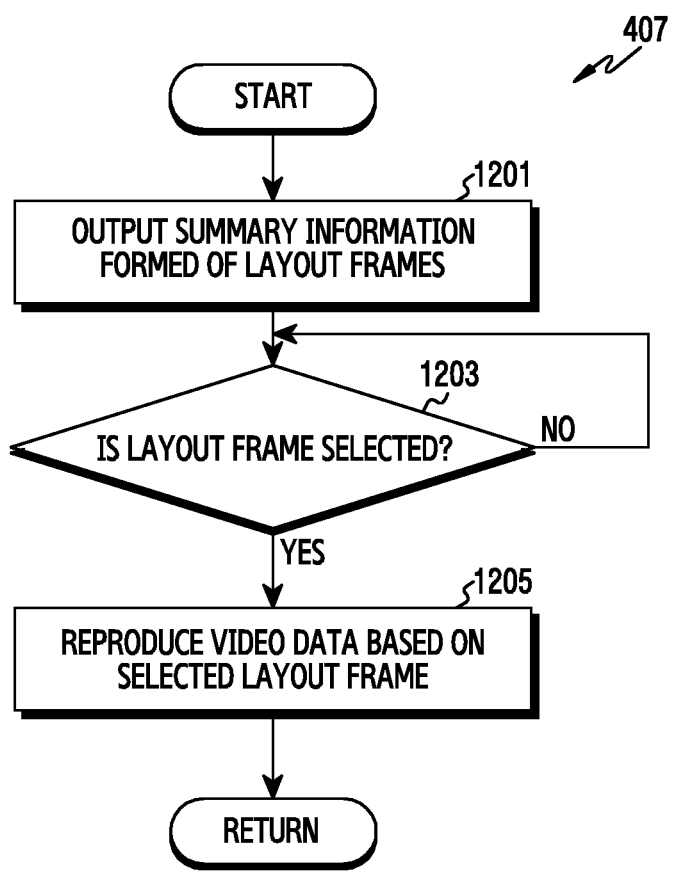
FIG. 12 is a flowchart illustrating an example frame display operation of the electronic device 101 according to various example embodiments of the present disclosure.
Figure 13A:
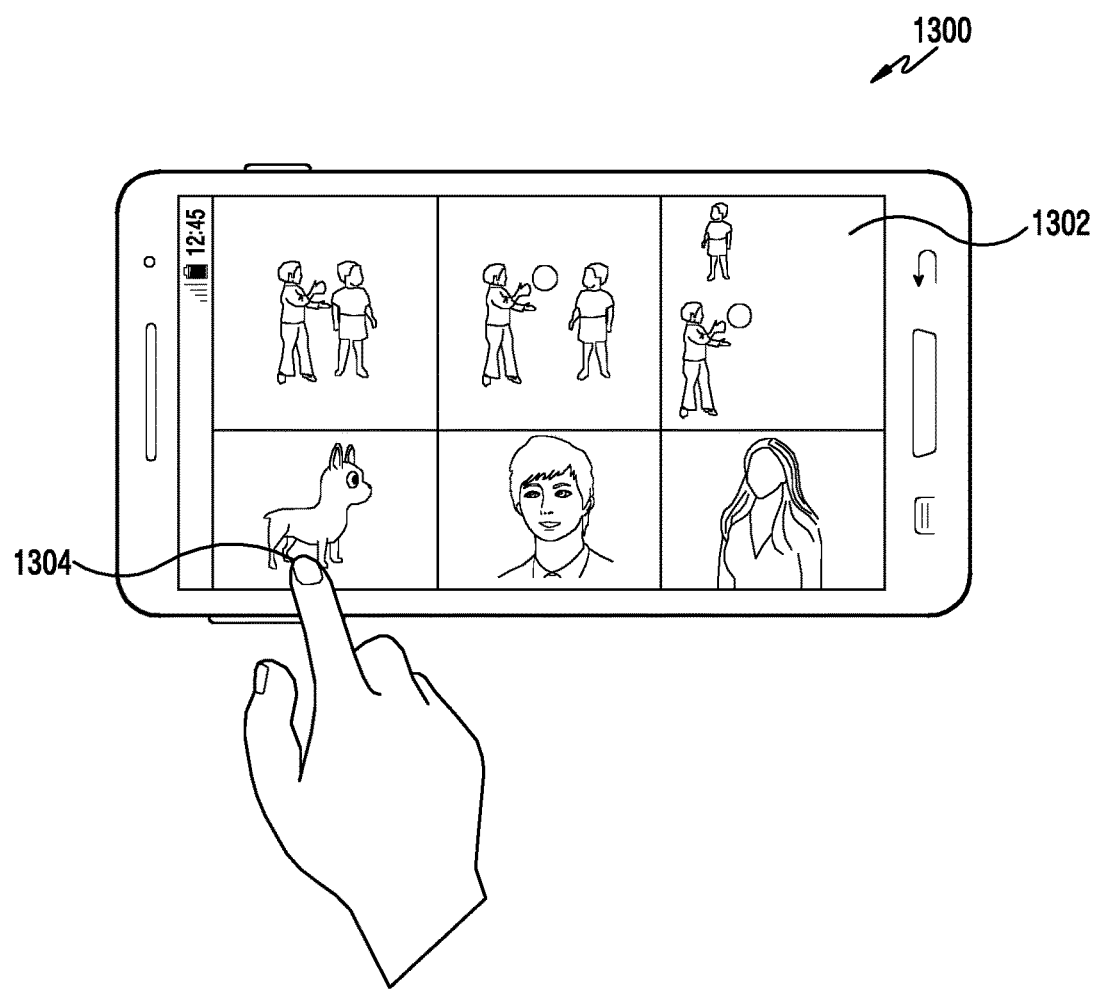
FIGS. 13A and 13B are diagrams illustrating an example of the frame display operation according to various example embodiments of the present disclosure.
Figure 13B:
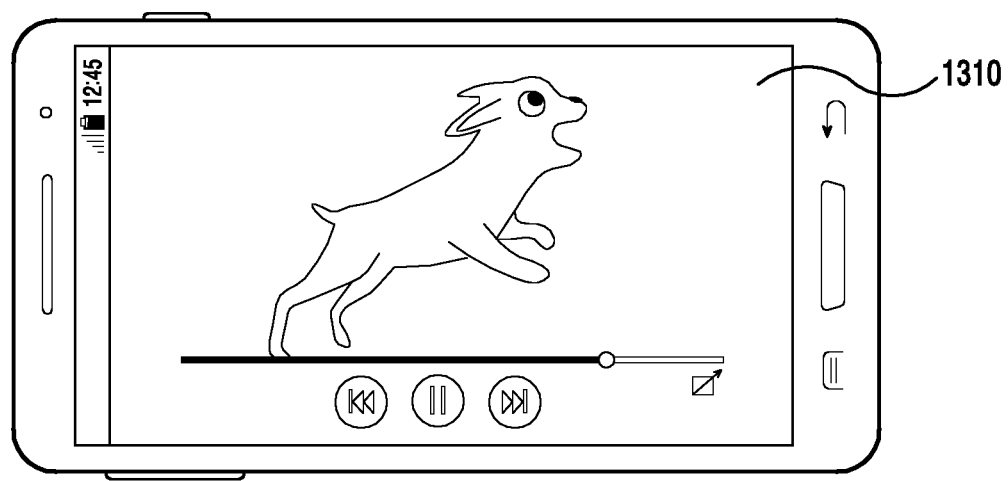

FIG. 12 is a flowchart illustrating an example frame display operation of the electronic device 101 according to various example embodiments of the present disclosure. In addition, FIGS. 13A and 13B are diagrams illustrating an example of the frame display operation according to various example embodiments of the present disclosure.

According to various embodiments, the layout display operation may be a detailed operation of operation 407 illustrated in FIG. 4.

Referring to FIG. 12, in operation 1201, the electronic device 101 may output summary information formed of layout frames.

In operation 1203, the electronic device 101 may determine whether at least one layout frame is selected in the state where the summary information is outputted. For example, the electronic device 101 may determine whether an input 1304 of selecting at least one layout frame is detected in the state 1300 where the summary information 1302 is outputted as illustrated in FIG. 13A. For example, the input of selecting the layout may include at least one of a touch input, a gesture input, a key input, or a voice input.

When at least one layout frame is not selected, the electronic device 101 may determine whether a layout frame is selected. For example, the electronic device 101 may perform an operation related to at least one of operation 1203.

When at least one layout frame is selected, the electronic device 101 may reproduce the video data based on the selected layout frame in operation 1205. For example, the electronic device 101 may store a start time and a finish time of each frame, and may acquire information related to at least one of a start time and a finish time of the selected layout frame. For example, with reference to FIG. 13B, the electronic device 101 may process the video data to be reproduced (1310) in a forward direction or a backward direction from the selected layout frame (for example, a start point).

According to another embodiment, the electronic device 101 may generate summary information for providing a three-dimensional effect with images corresponding to a plurality of points of time with respect to video data providing a three-dimensional effect. In this case, when at least one layout frame is selected by an input, the electronic device 101 may process an image corresponding to at least one point of time corresponding to the input to be reproduced.

Figure 14:
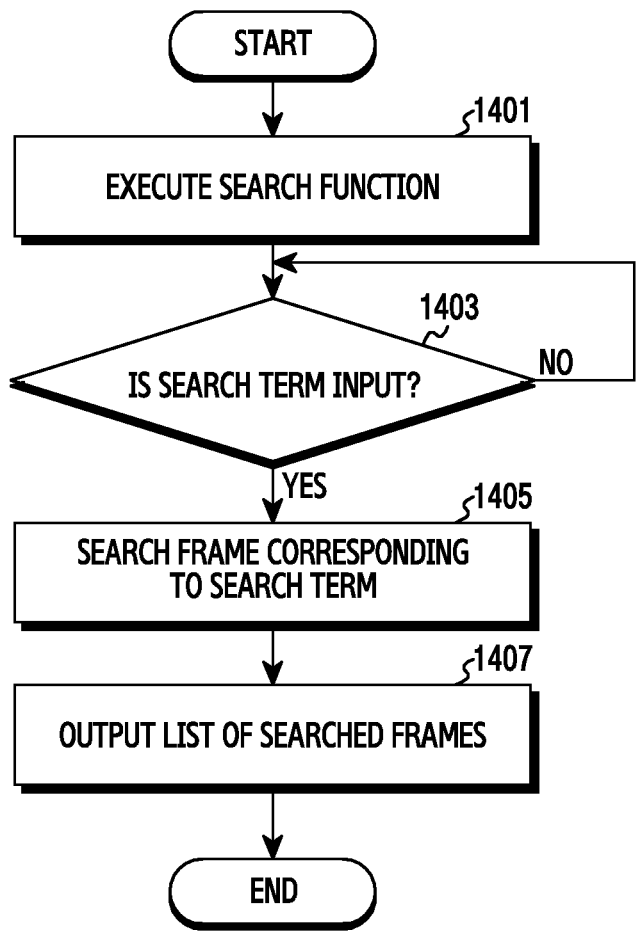
FIG. 14 is a flowchart illustrating an example video data search operation of the electronic device 101 according to various example embodiments of the present disclosure.
Figure 15:
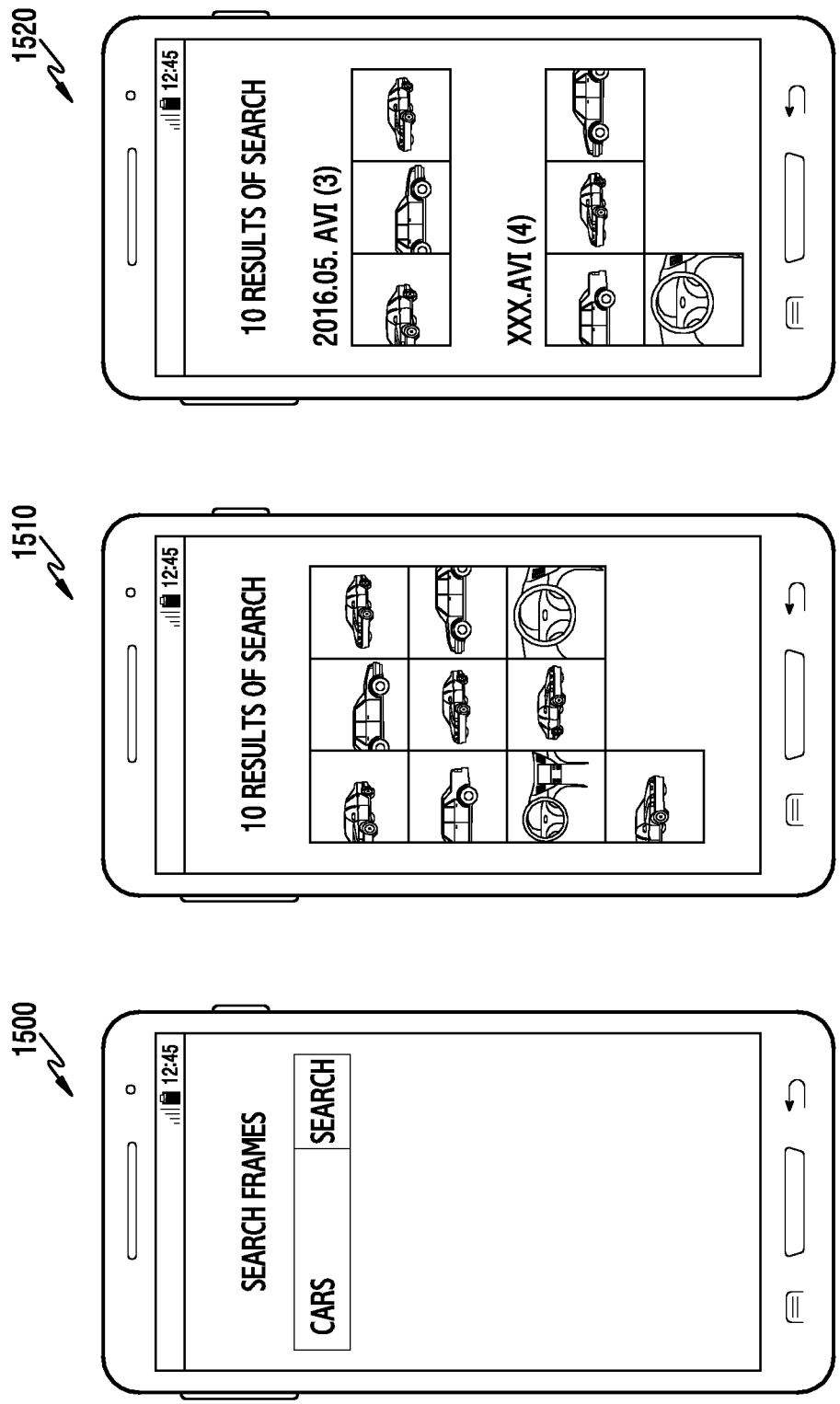
FIG. 15 is a diagram illustrating an example of a video data search operation according to various example embodiments of the present disclosure.

FIG. 14 is a flowchart illustrating an example video data search operation of the electronic device 101 according to various example embodiments of the present disclosure. In addition, FIG. 15 is a diagram illustrating an example of the video data search operation according to various example embodiments of the present disclosure.

Referring to FIG. 14, in operation 1401, the electronic device 101 may execute a search function. For example, the search function may be a function of searching data stored in the electronic device 101. For example, the stored data may be a layout frame which is extracted by the electronic device 101.

In operation 1403, the electronic device 101 may determine whether a search term for searching a layout frame is input.

When the search term for searching the layout frame is not input, the electronic device 101 may determine whether a search term is input. For example, the electronic device 101 may perform at least one operation of operation 1401 or operation 1403.

When the search term for searching the layout frame is input, the electronic device 101 may search a frame corresponding to the search term in operation 1405. For example, the electronic device 101 may extract at least one frame including an object corresponding to the search term. For example, when a search term is inputted (1500) as illustrated in FIG. 15, the electronic device 101 may extract a frame corresponding to the search term by searching the entirety or part of stored video data.

In operation 1407, the electronic device 101 may output a list of searched frames. For example, as illustrated in FIG. 15, the electronic device 101 may output the searched frames as a single search result 1510 without distinguishing the data. In another example, the electronic device 101 may output the searched frames as a search result by classifying them by video data (1520).

According to various example embodiments of the present disclosure, an operation method of an electronic device may include: extracting a plurality of frames from video data; identifying at least one of a size of an object included in each of the extracted frames and a number of objects included in each of the extracted frames; determining a layout regarding each of the extracted frames based on the size of the object and the number of objects; and displaying the extracted frames to correspond to the layout.

According to an example embodiment, determining the layout may include determining at least one of a size of a frame and a display location of a frame.

According to an example embodiment, determining the layout may include determining a frame including a reference number or more of objects as a first layout. For example, the first layout may include a layout for highlighting frames to be distinguished from frames of a second layout.

According to an example embodiment, determining the layout may include determining a frame including an object having a size greater than or equal to a reference size as a first layout.

According to an example embodiment, determining the layout may include determining a frame including an object related to a specified photographing mode as a first layout.

According to an example embodiment, determining the layout may include a frame including audio information satisfying a condition as a first layout. For example, the audio information satisfying the condition may include at least one of a change in an emotion and a change in a speaker.

According to an example embodiment, determining the layout may include determining a frame having a time interval greater than or equal to a reference time as a first layout.

According to an example embodiment, displaying the extracted frames to correspond to the layout may include displaying the extracted frames based on a time sequence of the frames.

According to an example embodiment, the operation method of the electronic device may further include, in response to at least one frame being selected from among the frames displayed on a display of the electronic device, determining a time to reproduce the video data based on the selected frame.

An electronic device and an operation method thereof according to various example embodiments of the present disclosure may extract a plurality of frames from video data and generate summary information, such that a user can easily grasp contents of the video data. According to various embodiments, by adjusting a time to reproduce the video data based on a frame selected from among the frames provided as the summary information, the video data can be reproduced from a location desired by the user.

While various example embodiments have been described in the detailed descriptions of the present disclosure, various changes can be made within a limit without departing from the scope of the present disclosure. Therefore, the scope of the present disclosure should not be limited to and/or defined by the above-described example embodiments, and should be defined not only by the appended claims but also by the equivalents to the scopes of the claims.

What is claimed is:

1. An electronic device comprising:
    a display; and
    a processor connected with the display, the processor configured to:
        extract a plurality of frames from video data,
        identify, based on a face recognition function, first objects in each of the extracted frames,
        select a set of frames from the extracted frames based on at least one of sizes of the first objects identified in each of the extracted frames or a number of the objects identified in each of the extracted frames,
        determine a layout for displaying the extracted frames based on the set of frames, and
        display the extracted frames on the display according to the determined layout,
    wherein the processor is further configured to:
        if a number of the frames included in the set of frames is less than a reference frame number, identify, based on a recognition function, second objects in each of the extracted frames,
        select an additional set of frames from the extracted frames based on at least one of sizes of the second objects identified in each of the extracted frames or a number of the second objects identified in each of the extracted frames, and
        update the set of frames by adding the additional set of frames.

2. The electronic device of claim 1, wherein the layout comprises at least one of: a size of a frame and a display location of a frame.

3. The electronic device of claim 1, wherein the processor is configured to,
    display the set of the frames comprising frames of which the number of at least one of the first objects or the second objects is within a predetermined number range to a first layout, and
    display at least one other frame from among the extracted frames to a second layout,
    wherein the first layout comprises a layout for highlighting frames to be distinguished from frames of the second layout.

4. The electronic device of claim 1, wherein the processor is configured to,
    display the set of the frames comprising frames of which the sizes of at least one of the first objects or the second objects is within a predetermined size range to a first layout, and
    display at least one other frame from among the extracted frames to a second layout,
    wherein the first layout comprises a layout for highlighting frames to be distinguished from frames of the second layout.

5. The electronic device of claim 1, wherein the processor is configured to,
    display at least one frame related to a first specified photographing mode from among the set of the frames to a first layout, and
    display at least one other frame related to a second specified photographing mode from among the set of the frames to a second layout,
    wherein the first layout comprises a layout for highlighting frames to be distinguished from frames of the second layout.

6. The electronic device of claim 1, wherein the processor is configured to,
    display at least one frame comprising audio information satisfying a first condition from among the set of the frames to a first layout, and
    display at least one other frame comprising audio information satisfying a second condition from among the set of the frames to a second layout,
    wherein the first layout comprises a layout for highlighting frames to be distinguished from frames of the second layout, and
    wherein the audio information satisfying the condition comprises at least one of: a change in an emotion and a change in a speaker.

7. The electronic device of claim 1, wherein the processor is configured to,
    display a frame having a time interval greater than or equal to a reference time from among the set of the frames to a first layout, and
    display a frame having a time interval less the reference time from among the set of the frames to a second layout,
    wherein the first layout comprises a layout for highlighting frames to be distinguished from frames of the second layout.

8. The electronic device of claim 1, wherein the processor is configured to display the extracted frames based on a time sequence of the frames.

9. The electronic device of claim 1, wherein, in response to at least one frame being selected from among the extracted frames displayed on the display, the processor is configured to determine a time to reproduce the video data based on the selected frame.

10. The electronic device of claim 1, wherein the layout comprises at least one of: a size of a frame and a display location of a frame.

11. A method of operating an electronic device, the method comprising:
- extracting a plurality of frames from video data;
- identifying, based on a face recognition function, at least one first objects in each of the extracted frames;
- selecting a set of frames from the extracted frames based on at least one of sizes of the first objects identified in each of the extracted frames or a number of the objects identified in each of the extracted frames;
- determining a layout for displaying the extracted frames based on the set of frames;
- displaying the extracted frames according to the determined layout,
- if a number of the frame included in the set of frames is less than a reference frame number, identifying, based on a recognition function, second objects in each of the extracted frames,
- selecting an additional set of frames from the extracted frames based on at least one of sizes of the second objects identified in each of the extracted frames or a number of the second objects identified in each of the extracted frames,
- updating the set of frames by adding the additional set of frames.

12. The method of claim 11, wherein determining the layout comprises determining at least one of: a size of a frame and a display location of a frame.

13. The method of claim 11, wherein determining the layout comprises determining the set of the frames comprising frames of which the number of at least one of the first objects or the second objects is within a predetermined number range as a first layout, and determining at least one other frame from among the extracted frames as a second layout,
   wherein the first layout comprises a layout for highlighting frames to be distinguished from frames of the second layout.

14. The method of claim 11, wherein determining the layout comprises determining the set of the frames comprising frames of which the size of at least one of the first objects or the second objects is within a predetermined size range as a first layout, and determining at least one other frame from among the extracted frames as a second layout,
   wherein the first layout comprises a layout for highlighting frames to be distinguished from frames of the second layout.

15. The method of claim 11, wherein determining the layout comprises determining at least one frame related to a first specified photographing mode from among the set of the frames as a first layout, and determining at least one other frame related to a second specified photographing mode from among the set of the frames as a second layout,
   wherein the first layout comprises a layout for highlighting frames to be distinguished from frames of the second layout.

16. The method of claim 11, wherein determining the layout comprises determining at least one frame comprising audio information satisfying a first condition from among the set of the frames as a first layout, and determining at least one other frame comprising audio information satisfying a second condition from among the set of the frames as a second layout,
   wherein the first layout comprises a layout for highlighting frames to be distinguished from frames of the second layout, and
   wherein the audio information satisfying the condition comprises at least one of: a change in an emotion and a change in a speaker.

17. The method of claim 11, wherein determining the layout comprises determining a frame having a time interval greater than or equal to a reference time from among the set of the frames as a first layout, and determining a frame having a time interval less the reference time from among the set of the frames as a second layout,
   wherein the first layout comprises a layout for highlighting frames to be distinguished from frames of the second layout.

18. The method of claim 11, wherein displaying the extracted frames to correspond to the layout comprises displaying the extracted frames based on a time sequence of the frames.

19. The method of claim 11, further comprising, in response to at least one frame being selected from among the extracted frames displayed on a display of the electronic device, determining a time to reproduce the video data based on the selected frame.

20. The method of claim 11, wherein determining the layout comprises determining at least one of: a size of a frame and a display location of a frame.

* * * * *